United States Patent [19]
Aoi

[11] Patent Number: 4,695,992
[45] Date of Patent: Sep. 22, 1987

[54] OPTICAL INFORMATION RECORDING-REPRODUCING APPARATUS IN WHICH THE RELATIVE POSITION OF A PRIMARY BEAM AND SECONDARY BEAMS ON RECORDING MEDIUM IS VARIED DURING RECORDING AND REPRODUCTION OF INFORMATION

[75] Inventor: Shigeru Aoi, Yokohama, Japan

[73] Assignee: Canon Kabushiki Kaisha, Tokyo, Japan

[21] Appl. No.: 574,060

[22] Filed: Jan. 26, 1984

[30] Foreign Application Priority Data

Jan. 31, 1983 [JP] Japan ................... 58-12659
Jan. 31, 1983 [JP] Japan ................... 58-12663

[51] Int. Cl.⁴ .................. G11B 7/135; G11B 7/00
[52] U.S. Cl. .......................... 369/46; 369/44
[58] Field of Search ............ 369/44, 45, 46, 58, 369/54; 250/201 DF

[56] References Cited

U.S. PATENT DOCUMENTS

| | | | |
|---|---|---|---|
| 4,275,275 | 6/1981 | Bricot et al. | 369/109 |
| 4,423,495 | 12/1983 | Musha et al. | 369/45 |
| 4,453,239 | 6/1984 | Musha et al. | 369/46 |
| 4,462,095 | 7/1984 | Chen | 369/44 |
| 4,498,159 | 2/1985 | Daimon | 369/44 |
| 4,504,938 | 3/1985 | Tajima | 369/46 |
| 4,507,763 | 3/1985 | Kato | 369/44 |
| 4,512,004 | 4/1985 | Nonaka | 369/46 |
| 4,532,522 | 7/1985 | Tsunoda et al. | 369/46 |
| 4,547,872 | 10/1985 | Henmi et al. | 369/54 |

FOREIGN PATENT DOCUMENTS 0019924 12/1980 Fed. Rep. of Germany ........ 369/54

Primary Examiner—Raymond F. Cardillo
Assistant Examiner—Robert A. Weinhardt
Attorney, Agent, or Firm—Fitzpatrick, Cella, Harper & Scinto

[57] ABSTRACT

An optical information recording-reproducing apparatus in which a primary beam is applied to a recording medium and information is recorded and reproduced by the same primary beam while, at the same time, at least two secondary beams are applied to the recording medium and the lights of the secondary beams from the recording medium are detected to thereby obtain the position information of the primary beam on the recording medium has a device for varying the relative position of the primary beam and the secondary beams on the recording medium during recording of information and during reproduction of information.

8 Claims, 13 Drawing Figures

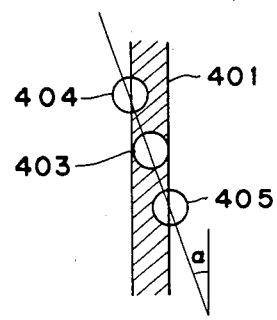
FIG. 4A
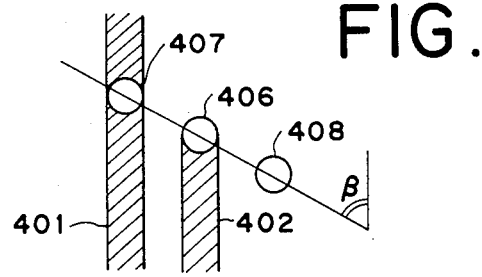
FIG. 4B
FIG. 6
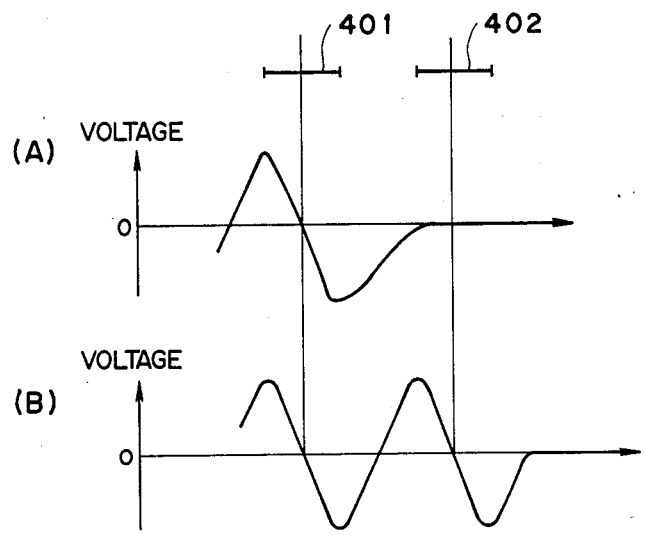

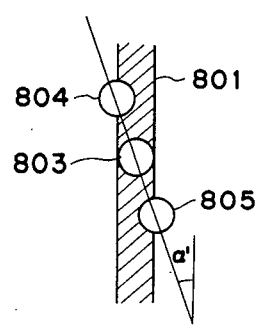
FIG. 8A
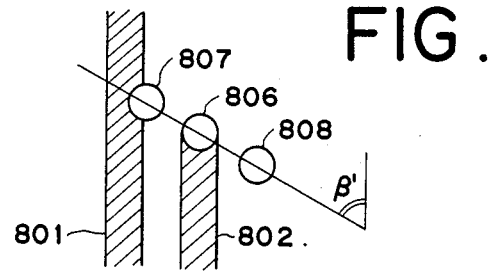
FIG. 8B
FIG. 10
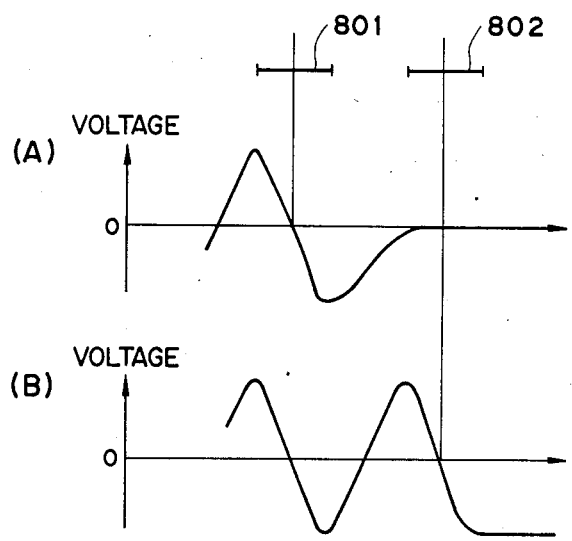

OPTICAL INFORMATION RECORDING-REPRODUCING APPARATUS IN WHICH THE RELATIVE POSITION OF A PRIMARY BEAM AND SECONDARY BEAMS ON RECORDING MEDIUM IS VARIED DURING RECORDING AND REPRODUCTION OF INFORMATION

BACKGROUND OF THE INVENTION

1. Field of the Invention

This invention relates to an optical information recording-reproducing apparatus for recording and reproducing information by the use of an optical recording medium such as an optical disk or a magneto-optical disk, and in particular to an apparatus continuously for recording highly dense information.

2. Description of the Prior Art

As an optical information recording-reproducing apparatus of this type, there is one as shown in FIG. 1 of the accompanying drawings. As shown, an intermittent laser beam put out from a laser beam source 101 in conformity with information to be recorded during information recording is reflected by a polarizing beam splitter 102, passes through a quarter wave plate 103 and is condensed on a disk-like recording medium (hereinafter referred to as the disk) 105 by an objective lens 104 and thus, information is recorded. At the same time, the reflected light from the disk 105 passes through the objective lens 104 and the quarter wave plate 103 and is transmitted through the polarizing beam splitter 102, whereafter it passes through an astigmatism optical system 106 and is applied to a four-division light detector 107, and a lens driving device 108 is driven in accordance with an auto-focus signal obtained from the detector 107 to thereby effect an auto-focus operation in which the objective lens 104 is displaced in the direction of the optic axis (the direction of the focus).

The above-described optical systems 101–104 and 106–108 are disposed on a base plate called a recording head 109. This recording head 109 is moved radially of the disk 105 by a head driving unit 110 and a head driving motor 111, and the motor 111 is controlled by a motor control circuit 112 so that the recording head 109 is moved at a predetermined speed. The disk 105 is rotated by a spindle motor 116, which in turn is controlled by a spindle motor control circuit 117 so that it is rotated at a predetermined angular speed.

In such a conventional apparatus, however, there is a limit in the mechanical accuracy of the driving portions such as the head driving unit and the head driving motor, and the track interval cannot be made very narrow under the influence of the eccentricity of the disk resulting from the removal thereof, and this has been a hindrance to highly dense recording.

An optical information recording-reproducing apparatus which is capable of accomplishing more highly dense recording is proposed in British Patent No. 1,465,742. This example is shown in FIG. 2 of the accompanying drawings. A disk 201 provided with a guide track is rotated about a shaft 202 by a motor 203 radially movable by a slide 204. The guide track may be one written in the disk in advance by utilization of the variation or the like in reflection factor, and for example, where information is written in the nth track of the disk, information written in the (n−1)th track may be used as the guide track. An electro-optical modulator 206 is provided in the optical path from a laser beam source 205 to the disk 201. This modulator 206 is controlled by a signal supplied to terminals 207 and 207' so that a light spot affects the photosensitive layer of the disk at a predetermined moment in accordance with a signal representative of information for a predetermined period of time.

A modulated beam 220 is reflected toward a diffraction grating 211 such as a phase diffraction grating by a semi-transparent mirror 209. This diffraction grating 211 divides the beam 220 into sub-beams of different diffraction orders, i.e., a 0-order beam a and two 1 st-order beams b and c. A beam 230 is emitted by a light source 210 such as, for example, a laser. This beam 230 passes through the semi-transparent mirror 209 and, like the writing beam 220, it is divided into three beams of different diffraction orders by the diffraction grating 211.

When information is to be written in the disk, the beam 230 is intercepted by closing the aperture of an apertured flat plate 216, for example. In this case, the beam a is a writing beam. When information is to be read out, the aperture of an apertured flat plate 208 is closed and the aperture of the apertured flat plate 216 is opened to make the beam a into a reading beam.

The image 211' of the diffraction grating 211 is formed, for example, on the focal plane of a lens 215 by a lens 212. Two light spots formed by primary beams b and c are projected onto the edge portion of the guide track during writing and projected onto the edge portion of an information track during reading. The central light spot formed by the 0-order beam a is projected onto the center of the guide track or the information track. Particularly, during writing, care must be taken so that the outputs of the primary beams may be low so that writing may not be effected by these beams.

The beam reflected by the disk is reflected toward a photoresponsive detecting system through a rotatable mirror 214 and a semi-transparent mirror 213. This detecting system comprises detectors 217, 218 and 219.

The detector 217 is a high-frequency information detector which supplies a signal proportional to the accumulated information during reading. By comparing the signals supplied by the detectors 218 and 219, there can be obtained the information regarding the position of the light spots and accordingly the positions of the reading and writing beams associated with the information track and the guide track. The signals supplied by the detectors 218 and 219 are electronically processed into control signals, and by these signals, the mirror 214, for example, can be rotated to correct the positions of the reading and writing beams.

However, in the apparatus as shown in FIG. 2, the use of two laser beam sources leads to a complicated structure of the apparatus, which in turn has led to a problem that the so-called optical pick-up including the light sources and the optical system becomes bulky. This problem will become more serious in the case of an apparatus of the type in which the optical pick-up is moved radially of the disk to thereby effect recording and reproduction than in the case of the apparatus of the type as shown in FIG. 2 wherein the disk is moved. There is also a method in which only a single light source 210 is used and an element 221 capable of changing over the intensity of the beam between the writing level and reading level is disposed in the optical path of the beam 230a, but in this case, the relative position of the primary beam 230a and the secondary beams 230b, 230c on the disk does not vary and therefore, it has been impossible to adopt a beam arrangement by which highly accurate tracking control can be effected both during recording and reproduction.

SUMMARY OF THE INVENTION

It is an object of the present invention to provide an optical information recording-reproducing apparatus which is simple in construction and capable of effecting highly accurate tracking control both during recording and reproduction.

The present invention is an optical information recording-reproducing apparatus in which a primary beam is applied to a recording medium and information is recorded and reproduced by the same primary beam while, at the same time, at least two secondary beams are applied to the recording medium and the lights of the secondary beams from the recording medium are detected to thereby obtain the position information of the primary beam on the recording medium, characterized in that the apparatus has means for varying the relative position of the primary beam and the secondary beams on the recording medium during recording of information and during reproduction of information.

The invention will become more fully apparent from the following detailed description thereof taken in conjunction with the accompanying drawings.

BRIEF DESCRIPTION OF THE DRAWINGS

FIGS. 4A and 4B show the spot arrangements on the recording medium of the apparatus shown in FIG. 3.

FIGS. 6(A) and (B) show the outputs of differential amplifier circuits corresponding to FIGS. 4A and 4B respectively.

FIGS. 8A and 8B show the spot arrangements on the recording medium of the apparatus shown in FIG. 7.

FIGS. 10(A) and (B) show the outputs of differential amplifier circuits corresponding to FIGS. 8A and 8B, respectively.

DESCRIPTION OF THE PREFERRED EMBODIMENTS

Figure 1:
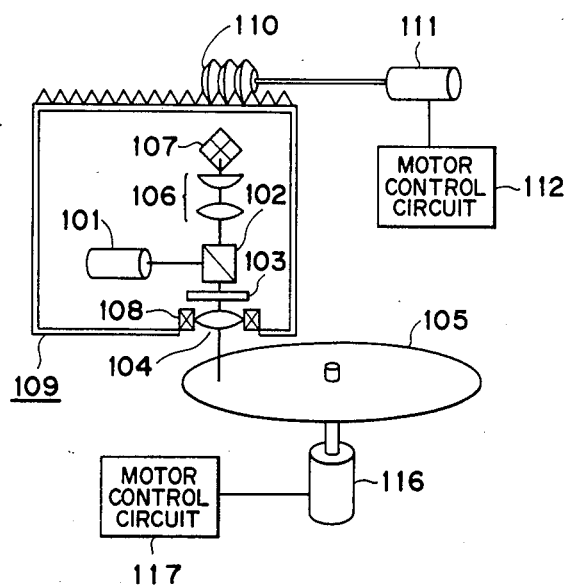
FIG. 1 is a schematic view showing the general construction of an optical information recording-reproducing apparatus according to the prior art.
Figure 2:
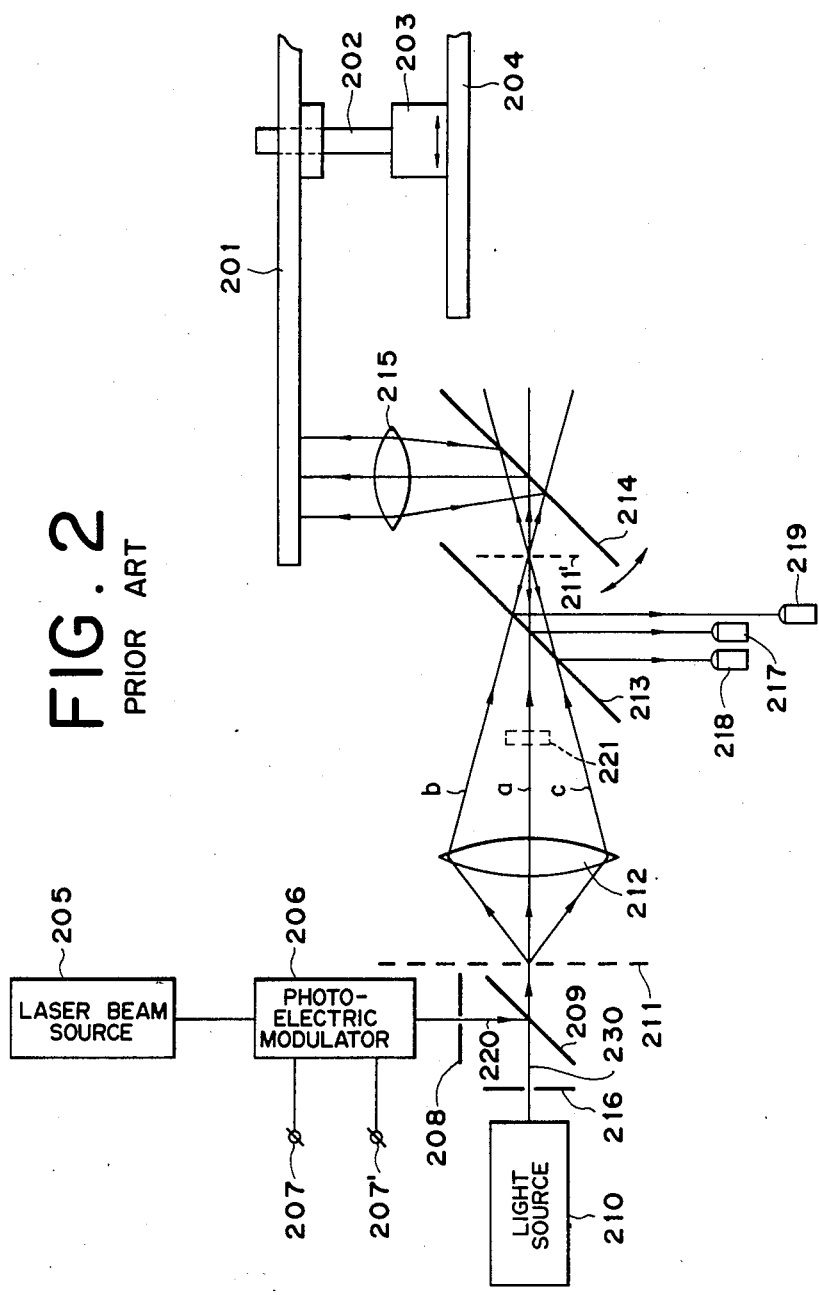
FIG. 2 is a schematic view showing an optical information recording-reproducing apparatus according to the prior art having tracking means during recording.
Figure 3:
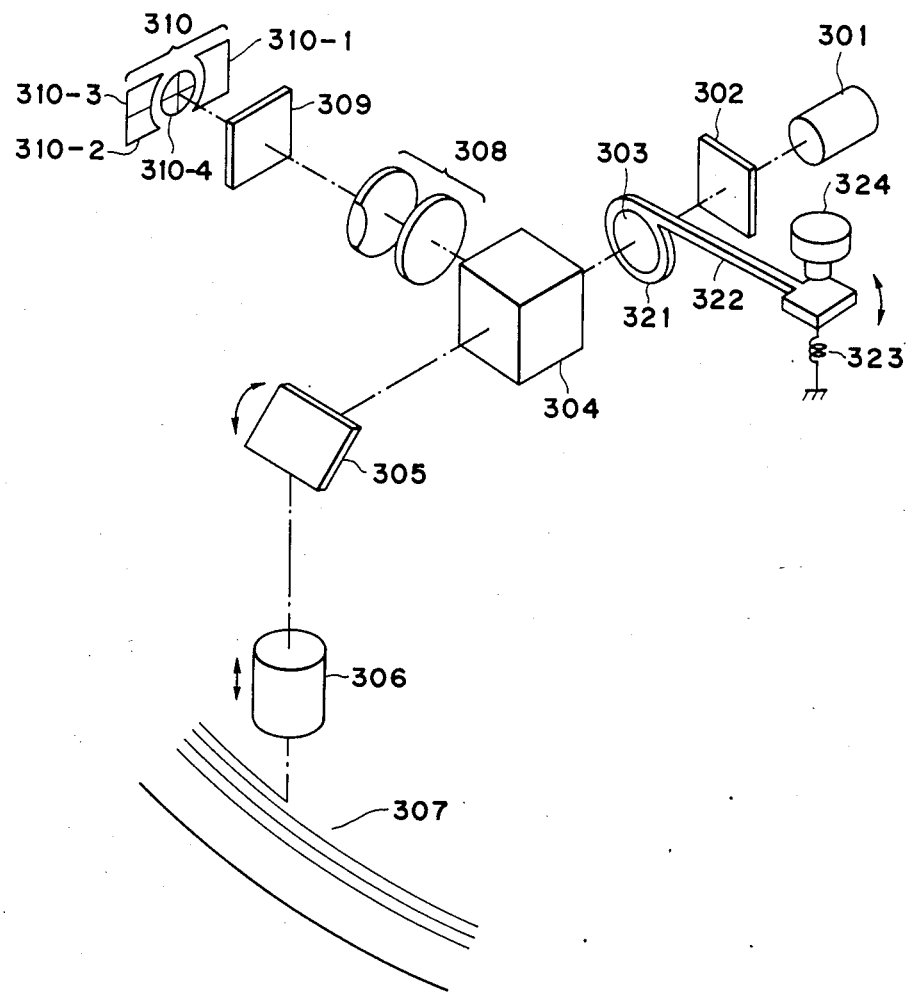
FIG. 3 is a schematic view showing a first embodiment of the optical information recording-reproducing apparatus according to the present invention.

Referring to FIG. 3 which shows a first embodiment of the optical information recording-reproducing apparatus of the present invention, reference numeral 301 designates a semiconductor laser emitting a laser beam, reference numeral 302 denotes a polarizer for polarizing the laser beam, reference numeral 303 designates a grating (diffraction grating) for dividing the laser beam, reference numeral 304 denotes a polarizing beam splitter for separating the laser beam in conformity with the direction of polarization thereof, reference numeral 305 designates a tracking mirror capable of vibrating the laser beam in the tracking direction, and reference numeral 306 denotes an objective lens for condensing the laser beam on a disk 307.

Reference numeral 308 designates an astigmatism optical system disposed in the optical path of the reflected light, reference numeral 309 denotes an analyzer for detecting only the polarized light in a predetermined direction of polarization, and reference numeral 310 designates a light detector for photoelectrically converting the reflected light passed through the analyzer 309. The light detector 310 comprises three light detectors 310-1-310-3 for obtaining a tracking signal and a four-division light detector 310-4 used for information reproduction and focusing signal detection. Reference numeral 321 designates a mounting frame for the grating 303, reference numeral 322 denotes a member (arm) integral with the mounting frame 321, reference numeral 323 designates a spring for pulling the rear end of the member 322, and reference numeral 324 denotes an electromagnet for rotating the grating 303 by a predetermined slight angle through the member 322.

The laser beam emitted from the semiconductor laser 301 has its plane of polarization shaped by the polarizer 302 and is divided into three beams as 0-order and ±1st-order diffracted lights by the grating 303. These three beams pass through the polarizing beam splitter 304, are directed toward the track on the disk 307 by the tracking mirror 305, are condensed on the disk 307 by the objective lens 306 and become three beam spots of 0-order (primary beam) and ±1st-order (secondary beams) diffracted lights.

The laser beam reflected from the disk 307 passes through the objective lens 306 and the tracking mirror 305, and is reflected by the polarizing beam splitter 304, and that reflected light passes through the astigmatism optical system 308 and the polarized light of the signal component is separated by the analyzer 309 and is received by the light detector 310. An auto-focus signal, an auto-tracking signal and an information signal of received frequency are obtained from the light detector 310.

At that time, in the case of reproducion, the laser beam is emitted at a predetermined low output which will not enable recording to be effected, and the three beam spots (light spots) on the disk 307 are arranged relative to a track 401 as shown in FIG. 4A. The light spot 403 by the primary beam superposed on the center of the track 401 is a spot for reproducing recorded information. The light spots 404 and 405 by the secondary beams are spots for obtaining signals for tracking on the track 401 and are half-superposed on the track 401.

On the other hand, in the case of recording, the laser beam emitted from the laser 301 is modulated by an information signal as a recording output. Also, the grating 303 is rotated by a slight angle, whereby three beam spots are widely arranged on the disk 307 as shown in FIG. 4B. The track 401 is a track recorded before one round of the disk, and the track 402 is a track being currently recorded. The spot 406 by the primary beam is a recording spot. The spot 407 by the secondary beam is one for obtaining a tracking signal and is arranged so as to be superposed on the track 401 recorded before one round. As regards the laser powers of the three spots 406–408, only the central spot 406 has an output sufficient to effect recording and the other two spots 407 and 408 are power-distributed so as to have such a degree of low output which does not effect recording. For example, power distribution is effected by the grating 303 so that an information track is formed on the surface of the medium if the laser power of the spot is 4 mW or more and that where the information track is not formed for 4 mW or less, the central spot 406 is 6 mW and the spots 407 and 408 are 2 mW.

A record pattern may be formed, for example, by recording logic "1" or "0" on the disk by a binary signal, and for logic "1⇌", the laser is caused to emit light by the above-mentioned output, and in the case of logic "0" as well, the laser is caused to emit light by one-half of the above-mentioned output to obtain a tracking signal.

The grating 303 is rotatable about the optic axis (not shown), and the member (arm) 322 is extended from the mounting frame 321 of the grating and is pulled by the spring 323 during reproduction but is pulled by the electromagnet 324 during recording to rotate the grating 303 slightly. For example, where the track width is 1 $\mu$m and the track pitch is 2 $\mu$m and the intervals between the three beams are 5 $\mu$m, respectively, the angle $\alpha$ or $\beta$ formed between the line passing through the centers of the three beams 403–405 and 406–408 and the track 401 or 402 is $\beta = 0.57°$ (see FIG. 4A) during reproduction and $\beta = 2.29°$ (see FIG. 4B) during recording and thus, if the length of the member 322 is 30 mm, the end portion of this member may be moved up and down by 0.9 mm.

Figure 5:
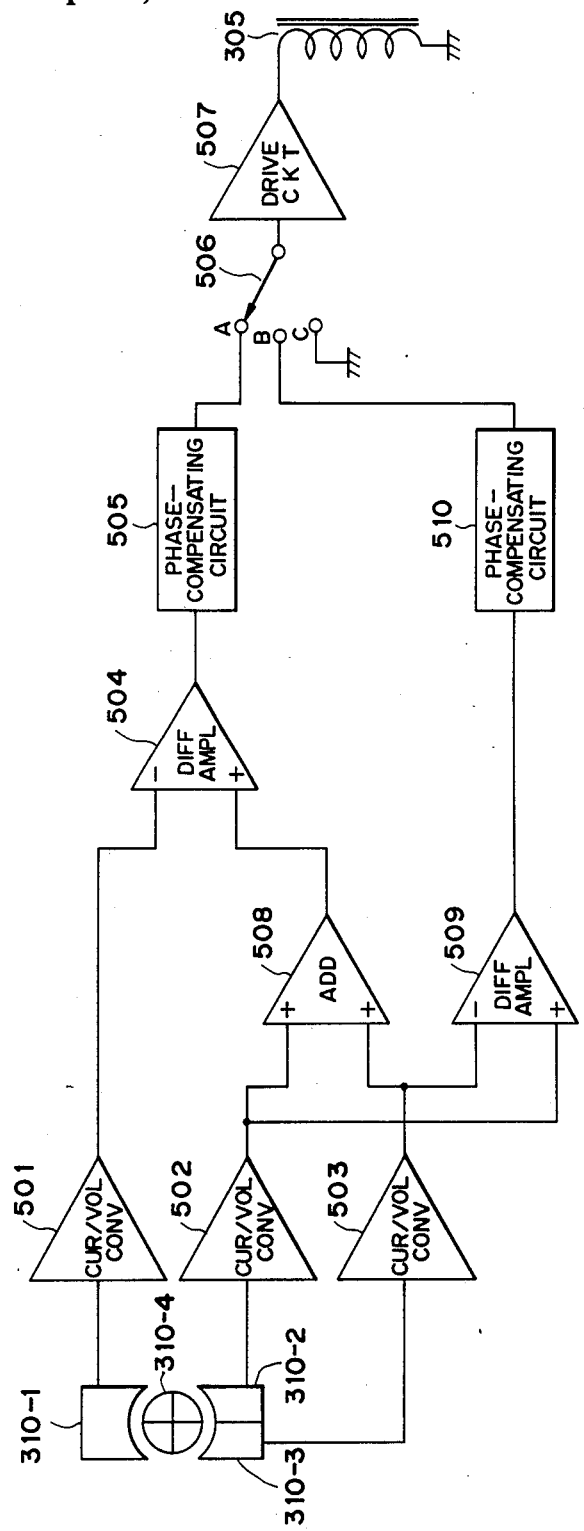
FIG. 5 is a block diagram showing an example of the construction of the tracking circuit of the apparatus shown in FIG. 3.

FIG. 5 shows an example of the construction of the tracking circuit of the apparatus shown in FIG. 3. The laser beam reflected from the beam spot 403 or 406 of FIGS. 4A and 4B is received by the four-division light detector 310-4 of FIG. 5, and the laser beams from the beam spots 404 and 405 or 407 and 408 are received by the light detectors 310-1, 310-3 and 310-2. The photocurrents from the light detectors 310-1 to 310-3 are converted into voltages by corresponding current-voltage converting circuits 501–503, respectively.

During reproduction, the outputs of the converting circuits 502 and 503 are summed by an adder circuit 508 and the difference between the outputs of the converting circuit 501 and the circuit 508 is taken in a differential amplifier circuit 504, and the deviation of the track is obtained in the form of a voltage value. The output of the differential amplifier circuit 504 corresponding to FIG. 4A is shown in FIG. 6(A). In FIG. 6(A), the vertical axis represents the voltage and the horizontal axis represents the position of the central beam 403 on the track 401. The output of the differential amplifier circuit 504 is supplied to a drive circuit 507 through a phase-compensating circuit 505 and a switch 506, and the tracking mirror 305 is driven by the drive circuit 507 to thereby effect tracking. The switch 506 is closed at its contact A during reproduction and is closed at its contact B during recording.

When recording is to be effected, it is only 407 of the two tracking spots 407 and 408 that is on the track and therefore, use is made only of the outputs of the light detectors 310-2 and 310-3 which receive the reflected light from this spot 407. The reflected light from the laser spot 407 is imaged on the light detectors 310-2 and 310-3 with the relation between the laser spot 407 and the track 401 remaining unchanged. If control is effected so that the difference between the outputs of the light detectors 310-2 and 310-3 is zero, the spot 407 effects tracking on the track 401, whereby recording is accomplished by the spot 406 having a predetermined interval. Thus, the outputs of the light detectors 310-2 and 310-3 converted into voltages by the current-voltage converting circuits 502 and 503 are supplied to a differential amplifier circuit 509 and a voltage corresponding to the difference therebetween is obtained by the differential amplifier circuit 509. This output is shown in FIG. 6(B) corresponding to FIG. 4B. The output of the differential amplifier circuit 509 is supplied to the drive circuit 507 through a phase-compensating circuit 510 and the switch 506, and the tracking mirror 305 is driven by the drive circuit 507 to thereby effect tracking.

The reading of information and the detection of the focusing signal by the four-division light detector 310-4 are carried out in a well-known manner and need not be described in detail herein.

Figure 7:
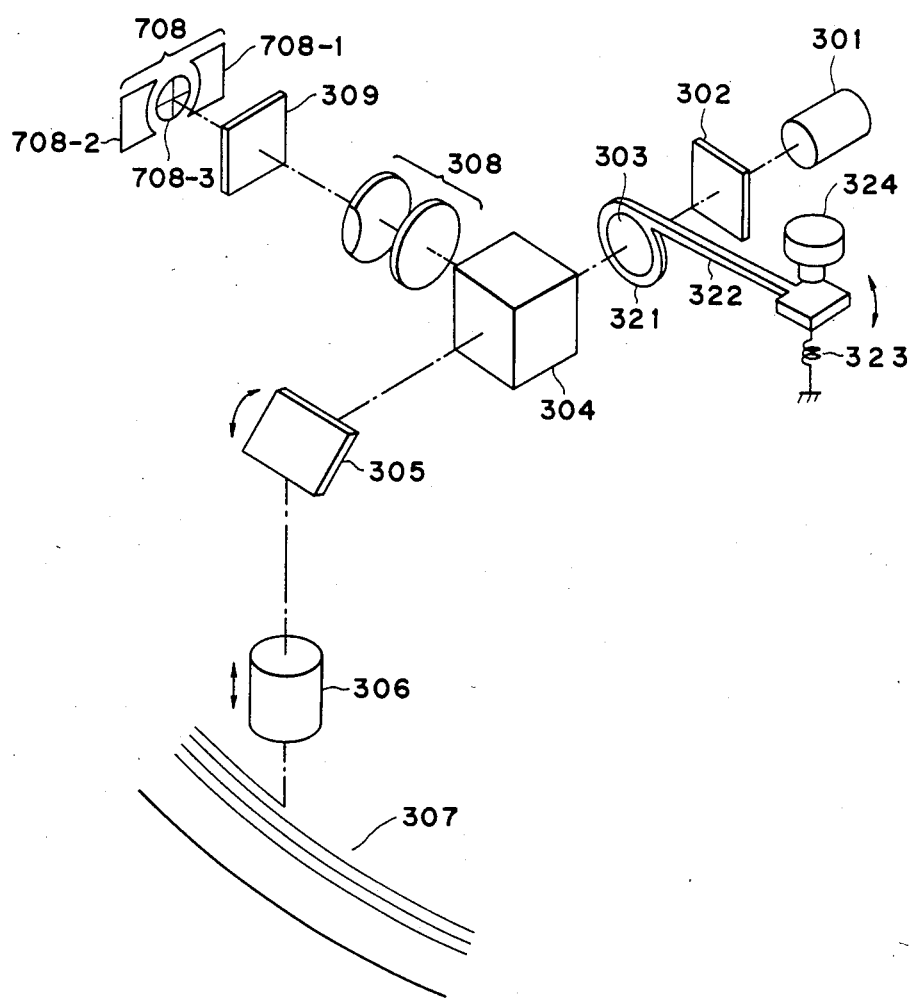
FIG. 7 is a schematic view showing a second embodiment of the optical information recording-reproducing apparatus according to the present invention.

FIG. 7 shows an optical system according to a second embodiment of the present invention. This embodiment is similar in construction to the embodiment of FIG. 3 except for a light detector 708 and in this embodiment, common members are given similar reference numerals. As in the embodiment of FIG. 3, the laser beam emitted from a semiconductor laser source 301 has its plane of polarization shaped by a polarizer 302 and passes through a grating 303, whereby it is divided into three beams as 0-order (primary beam) and ±1st-order (secondary beams) diffracted lights. Thereafter, the beams pass through a polarizing beam splitter 304, are directed toward the track on the disk by a tracking mirror 305 and are condensed on the disk 307 through an objective lens 306.

The laser beam reflected from the disk 307 passes through the objective lens 306 and the tracking mirror 305, is reflected by the polarizing beam splitter 304, and passes through an astigmatism optical system 308, and the polarized light of the signal component is separated by an analyzer 307 and reaches a light detector 708. The light detector 708 comprises light detectors 708-1 and 708-2 for obtaining a tracking signal and a four-division light detector 708-3 for obtaining a focusing signal and an information signal.

In the optical system shown in FIG. 7, when data reproduction is to be effected, three beam spots on the disk (the laser beam has a predetermined degree of output which cannot effect recording) are arranged relative to a track 801, as shown in FIG. A. The light spot 803 by the primary beam is a spot for reproducing recorded information. The light spots 804 and 805 by the secondary beams are half-superposed on the track 801 to obtain a signal for tracking on the track 801. This spot arrangement is the same as the spot arrangement of the first embodiment shown in FIG. 4A, and $\alpha = \alpha'$.

In the optical system shown in FIG. 7, when data recording is to be effected, the laser beam emitted from the laser source 301 has recordable energy and is modulated by an information signal. The grating 303 is rotated by a slight angle different from that in the first embodiment, and three beam spots are arranged as shown in FIG. 8B. In FIG. 8B, the track 801 is a track recorded before one round of the disk and the track 802 is a track being currently recorded. That is, the spot 806 by the primary beam is a recording spot and the spot 807 by the secondary beam is arranged so as to be half-superposed on the track 801 recorded before one round in order to obtain a tracking signal. As the laser powers of these three spots, the central spot 806 has an output sufficient to be capable of effecting recording and the other two spots 807 and 808 are power-distributed so as to have such a degree of output which does not effect recording. For example, power distribution is effected by the grating 303 so that where information tracks are formed on the surface of the medium for more than 4 mW and not formed thereon for less than 4 mW, the central spot 806 is 6 mW and the spots 807 and 808 are 2 mW. As in the first embodiment, the laser is caused to emit light by the above-mentioned output when a record pattern is formed on the disk, and the laser is caused to emit light by one-half of the above-mentioned output when a record pattern is not formed on the disk.

The grating 303 is rotated by a mechanism similar to that in the first embodiment, but the angle of rotation thereof is set so as to differ from that in the first embodiment, as previously described. For example, where the track width is 1 μm and the track pitch is 2 μm and the intervals between the three beams are 5 μm, respectively, the angle formed between the line passing through the centers of the three beams and the track is $\alpha' = 0.57°$ (see FIG. 8A) during reproduction and $\beta' = 1.72°$ (see FIG. 8B) during recording. Thus, if the length of the member 308 is 30 mm, the end portion of this member may be moved up and down by 0.6 mm.

Figure 9:
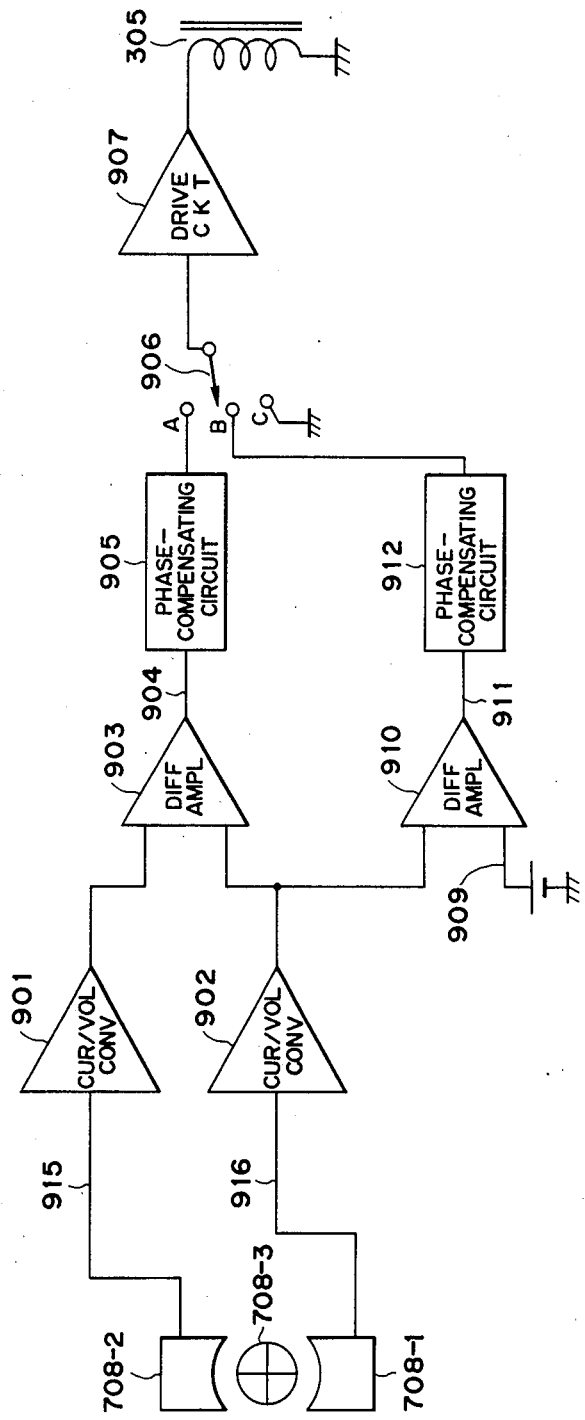
FIG. 9 is a block diagram showing an example of the construction of the tracking circuit of the apparatus shown in FIG. 7.

FIG. 9 shows a block diagram of the tracking circuit according to the present embodiment. The laser beam reflected from the beam spot 804 or 807 shown in FIG. 8 reaches a light detector 708-1. Also, the laser beam from the beam spot 805 or 808 reaches a light detector 708-2. The photocurrents from the light detectors 708-1 and 708-2 are converted into voltages by current-voltage converting circuits 901 and 902, respectively. During reproduction, the difference between these voltages is taken by the use of a differential amplifier circuit 903 and the deviation of the track is obtained in the form of a voltage value 904 (tracking signal).

FIG. 10(A) shows the tracking signal 904 corresponding to FIG. 8A. In FIG. 10(A), the vertical axis represents the voltage and the horizontal axis represents the position of the central beam. The shown tracking signal 904 drives the tracking mirror 305 through a phase-compensating circuit 905, a switch 906 and a drive circuit 907 and effects tracking.

The switch 906 is closed at its side A during reproduction and closed at its side B during recording. When recording is to be effected, it is only 807 of the two tracking spots 807 and 808 that is on the track and therefore, use is made only of the output signal 916 of the light detector 708-1 which receives the reflected light from this spot 807. The output voltage of the current-voltage converting circuit 902 is compared with a constant voltage signal 909 by a differential amplifier 910.

FIG. 10(B) shows the output signal 911 of the differential amplifier 910 corresponding to FIG. 8B. The voltage value of the constant voltage signal 909 is preset so as to be equal to the voltage value when the reflected light where the spot 807 is half-superposed on the track 801 reaches the light detector 708-1 and is supplied to the differential amplifier 910 through the current-voltage converting circuit 902. The output signal 911 of the differential amplifier 910 drives the tracking mirror 305 through a phase-compensating circuit 912, the switch 906 and the drive circuit 907 and effects tracking.

Figure 11:
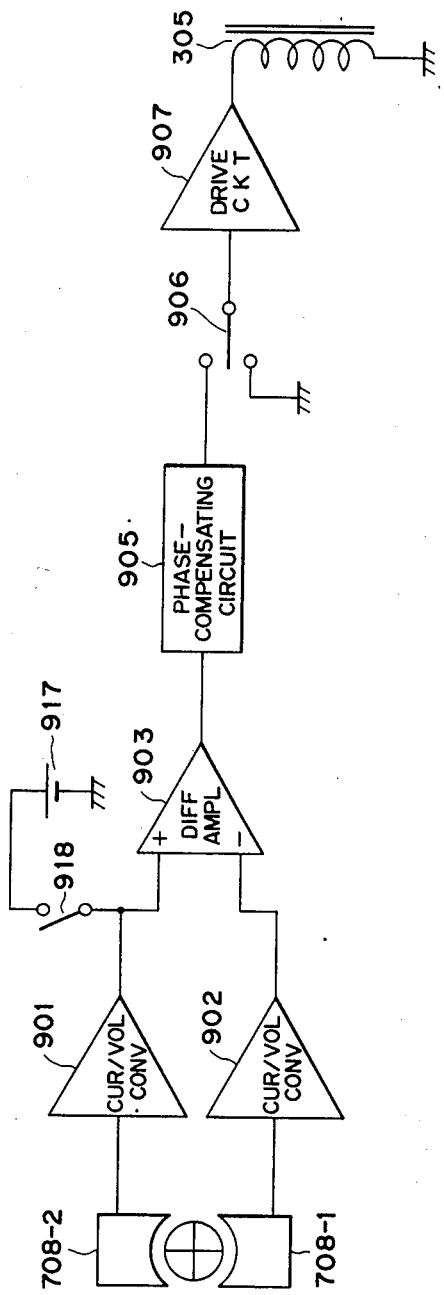
FIG. 11 is a block diagram showing another example of the construction of the tracking circuit of the apparatus shown in FIG. 7.

FIG. 11 shows another example of the construction of the tracking circuit of the second embodiment. In FIG. 11, members common to those in FIG. 9 are given similar reference numerals and need not be described in detail. First, the reflected light from the beam spot 808 is detected by the light detector 708-2. During recording, a switch 918 is closed and the output of a constant voltage source 917 is added to or subtracted from the output of the current-voltage converting circuit 90, and the tracking mirror 305 is moved in accordance with the difference between this output and the voltage value regarding the spot 807 (the output of the current-voltage converting circuit 902). During reproduction, the switch 918 is opened, the lights from the spots 804 and 805 are received by the light detectors 708-1 and 708-2, respectively, and the tracking mirror is moved by the difference between the outputs of the current-voltage converting circuits 901 and 902. According to the present construction, any tracking error caused by stain of the disk, the difference in reflection factor due to the position on the disk, or the like can be compensated for.

The present invention is not restricted to the above-described embodiments, but various applications thereof are possible. For example, a motor, a piezoelectric element or the like may be used to rotate the grating. Such rotation of the grating is not restrictive, but any means is applicable if it can vary the relative position of the primary beam for effecting recording and reproduction and the secondary beams for tracking on the recording medium. The shape of the recording medium is not restricted to the disk-like shape, but may also be a drum-like shape, a tape-like shape, a card-like shape or any other suitable shape.

What is claimed is:

1. An optical information recording-reproducing apparatus comprising:
   a light source;
   grating means for splitting a beam from said light source into a primary beam and at least two secondary beams;
   an optical system for applying the primary beam and the secondary beams to a recording medium;
   means for selectively carrying out an information recording on the recording medium in the form of an information track by the primary beam and a reproduction of the recorded information from the information track;
   means for detecting the secondary beams modulated by the recording medium to obtain a tracking signal;
   means for effecting tracking of the primary beam and the secondary beams according to the tracking signal; and
   means for varying a relative position of the primary beam and the secondary beams on the recording medium between times of the information recording and the information reproduction so that at least two of the secondary beams are applied to positions different widthwisely of the information track and not applied to a guide track adjacent to the information track being and not applied to a guide track adjacent to the information track scanned by the primary beam, at the time of the information reproduction, and that at least a part of at least one of the secondary beams is applied to said guide track adjacent to the information track being formed by the primary beam, at the time of the information recording.

2. An optical information recording-reproducing apparatus according to claim 1, wherein said recording medium is an optical disk.

3. An optical information recording-reproducing apparatus according to claim 1, wherein said guide track is an information track on which information recording has already been effected.

4. An optical information recording-reproducing apparatus according to claim 1, wherein the secondary beam applied to the guide track is completely applied thereon at the time of the information recording.

5. An optical information recording-reproducing apparatus according to claim 4, wherein said detecting means include light detectors divided widthwisely of the track for receiving the secondary beam from the guide track and means for differentiating outputs of said light detectors to obtain the tracking signal.

6. An optical information recording-reproducing apparatus according to claim 1, wherein the secondary beam applied to the guide track is substantially half-applied to the guide track at the time of the information recording.

7. An optical information-recording apparatus according to claim 6, wherein said detecting means includes a light detector for photoelectrically converting the secondary beam from the guide track and means for comparing an output from said light detector with a signal of a predetermined value to obtain the tracking signal.

8. An optical information-recording apparatus according to claim 6 wherein said detecting means includes a light detector for photoelectrically converting the secondary beam from the guide track and means for comparing an output from said light detector with a sum of a predetermined value and a photoelectrically converted output of the other secondary beam, not applied to the guide track, from the recording medium to obtain the tracking signal.

* * * * *

UNITED STATES PATENT AND TRADEMARK OFFICE
CERTIFICATE OF CORRECTION

PATENT NO. : 4,695,992

DATED : September 22, 1987

INVENTOR(S) : SHIGERU AOI

It is certified that error appears in the above-identified patent and that said Letters Patent is hereby corrected as shown below:

Column 1, line 16, "continuously for" should read --for continuously--.

Column 5, line 14, ""1$\overleftrightarrow{}$" should read --"1";

line 29, "$\beta$" should read --$\alpha$--.

Column 8, lines 61-62, "and not applied to a guide track adjacent to the information track" should be deleted.

Signed and Sealed this

Twenty-third Day of February, 1988

Attest:

DONALD J. QUIGG

Attesting Officer     Commissioner of Patents and Trademarks